United States Patent
Benner et al.

(10) Patent No.: US 9,667,476 B2
(45) Date of Patent: *May 30, 2017

(54) ISOLATING THE SOURCES OF FAULTS/POTENTIAL FAULTS WITHIN COMPUTING NETWORKS

(71) Applicant: INTERNATIONAL BUSINESS MACHINES CORPORATION, Armonk, NY (US)

(72) Inventors: Alan F. Benner, Pughkeepsie, NY (US); Christopher J. Colonna, Ossining, NY (US); John R. Flanagan, Poughkeepsie, NY (US); Dale F. Riedy, Poughkeepsie, NY (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/846,915

(22) Filed: Sep. 7, 2015

(65) Prior Publication Data

US 2016/0204980 A1 Jul. 14, 2016

Related U.S. Application Data

(63) Continuation of application No. 14/595,510, filed on Jan. 13, 2015.

(51) Int. Cl.
*H04L 12/28* (2006.01)
*H04L 12/26* (2006.01)
*H04L 12/24* (2006.01)

(52) U.S. Cl.
CPC ...... *H04L 41/0677* (2013.01); *H04L 41/0631* (2013.01); *H04L 43/16* (2013.01)

(58) Field of Classification Search
CPC .. H04L 41/0631; H04L 41/0677; H04L 43/16
(Continued)

(56) References Cited

U.S. PATENT DOCUMENTS

2004/0085894 A1* 5/2004 Wang ............... H04L 41/0663
370/216
2006/0221841 A1* 10/2006 Lee .................. H04L 43/0811
370/242

(Continued)

OTHER PUBLICATIONS

"z/Architecture—Principles of Operation," Publication No. SA22-7832-09, 10th Edition, Sep. 2012, 1568 pages.
(Continued)

*Primary Examiner* — Thai Hoang
(74) *Attorney, Agent, or Firm* — Steven Chiu, Esq.; Blanche E. Schiller, Esq.; Heslin Rothenberg Farley & Mesiti P.C.

(57) ABSTRACT

The health of a computing network is checked to determine whether there is a current fault in the network or a prediction of a potential fault in the network. The fault can be any type of fault, including a link failure, a failure in the transmitter of data over the link, a failure in the receiver of the data, or any other type of failure. If a fault or potential fault is indicated, a deterministic approach is provided for finding the source of the fault or potential fault within the network. The deterministic approach uses current values for selected operational parameters of components within the network, as well as historical data to determine the source.

10 Claims, 6 Drawing Sheets

(58) Field of Classification Search
USPC .................................. 370/242–245, 248–253
See application file for complete search history.

(56) References Cited

U.S. PATENT DOCUMENTS

| | | | | |
|---|---|---|---|---|
| 2009/0285107 | A1* | 11/2009 | Sakurai ................ | B60W 50/02 370/242 |
| 2010/0128596 | A1* | 5/2010 | Saitoh ................ | H04L 41/0681 370/216 |
| 2011/0153236 | A1* | 6/2011 | Montreuil .......... | G01R 19/2513 702/59 |
| 2011/0292813 | A1* | 12/2011 | Dunbar .............. | H04L 12/4641 370/244 |
| 2013/0088802 | A1* | 4/2013 | Berggren ............... | H02H 7/268 361/65 |

OTHER PUBLICATIONS

"Fibre Channel—Link Services (FC-LS-3)", American National Standard for Information Technology, Feb. 1, 2014, 207 pages.
"Fibre Channel—Physical Interface-6 (FC-PI-6)", American National Standard for Information Technology, Oct. 25, 2013, 67 pages.
Benner, Alan F. et al., "Isolating the Source of Faults/Potential Faults Within Computing Environments," U.S. Appl. No. 14/595,510, filed Jan. 13, 2015, pp. 1-32.
List of IBM Patents of Patent Applications Treated As Related, Mar. 18, 2016, pp. 1-2.
Office Action for U.S. Appl. No. 14/595,510 dated Sep. 21, 2016, pp. 1-7.
Notice of Allowance for U.S. Appl. No. 14/595,510 dated Feb. 8, 2017, pp. 1-12.

* cited by examiner

ISOLATING THE SOURCES OF FAULTS/POTENTIAL FAULTS WITHIN COMPUTING NETWORKS

This application is a continuation of co-pending U.S. Ser. No. 14/595,510, entitled "ISOLATING THE SOURCES OF FAULTS/POTENTIAL FAULTS WITHIN COMPUTING NETWORKS," filed Jan. 13, 2015, which is hereby incorporated herein by reference in its entirety.

BACKGROUND

One or more aspects relate, in general, to computing networks, and in particular, to isolating the sources of faults or potential faults within computing networks.

A computing network allows devices, such as computers, to exchange data and share resources. It includes various components, such as switches that connect devices to one another and links that interconnect the switches. There are different types of computing networks, including, but not limited to, local area networks (LANs), wide area networks (WANs), and storage area networks (SANs), to name a few. There are also various networking technologies, including, for instance, Fibre Channel, Ethernet and InfiniBand, each with its own advantages and disadvantages.

Some networking technologies, such as Fibre Channel, Ethernet and InfiniBand, use optical interfaces. At higher speeds on such interfaces, the links are very sensitive to data transmission errors. The sources of these errors, however, are not always immediately apparent. There may be a variety of causes that are difficult to diagnose and often require human intervention to determine.

SUMMARY

Shortcomings of the prior art are overcome and additional advantages are provided through the provision of a computer-implemented method of isolating sources of alerts within computing networks. The computer-implemented method includes, for instance, obtaining, by a control entity executing on a processor of a computing environment, one or more values for one or more operational parameters of a network of the computing environment; detecting by the control entity an alert associated with the network; obtaining, by the control entity based on detecting the alert, at least one current value for at least one operational parameter of the one or more operational parameters; and determining a source for the alert, wherein the determining the source for the alert comprises using at least a portion of the obtained one or more values for the one or more operational parameters and the obtained at least one current value for the at least one operational parameter to determine the source of the alert.

Computer program products and systems relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE SEVERAL VIEWS OF THE DRAWINGS

One or more aspects are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

In accordance with one or more aspects, a capability is provided for checking the health of a network of a computing environment. The checking may indicate an alert, which is a current fault in the network or a prediction of a potential fault in the network. The fault can be any type of fault, including, but not limited to, a link failure, a link not operating at an acceptable speed, such as an acceptable operating and/or capable speed, a failure in the transmitter of data over the link and/or a failure in the receiver of the data. One or more aspects of the capability provide a deterministic approach for finding the source of the faults or potential faults within the network. The approach is performed systematically and absent user intervention. As a particular example, the capability reliably determines whether data transmission errors in optical links are caused by failure in the optical transmitters, by cable/connector problems, or by failure of the receiver electronic circuitry. Other examples also exist.

As indicated above, there are various types of networks. One such type of network to incorporate one or more aspects of the network health checking/alert isolation capability described herein is a storage area network (SAN) that uses Fibre Channel, Ethernet or InfiniBand technology, as examples. (Other types of networks and/or other types of technologies may also be used.) A storage area network is used, for instance, to enhance access to storage devices, such as disk arrays, tape libraries and optical jukeboxes, accessible to servers so that the devices appear like locally attached devices to the operating system. A storage area network typically has its own network of storage devices.

A storage area network often uses a fabric topology, such as a Fibre Channel fabric, which is an infrastructure specially designed to handle storage communications. It provides faster and more reliable access than higher level protocols used in other types of networks, such as network attached storage (NAS). A fabric is similar in concept to a network segment in a local area network. A typical Fibre Channel SAN fabric is made up of a number of Fibre Channel switches, interconnected by various links.

Figure 1:
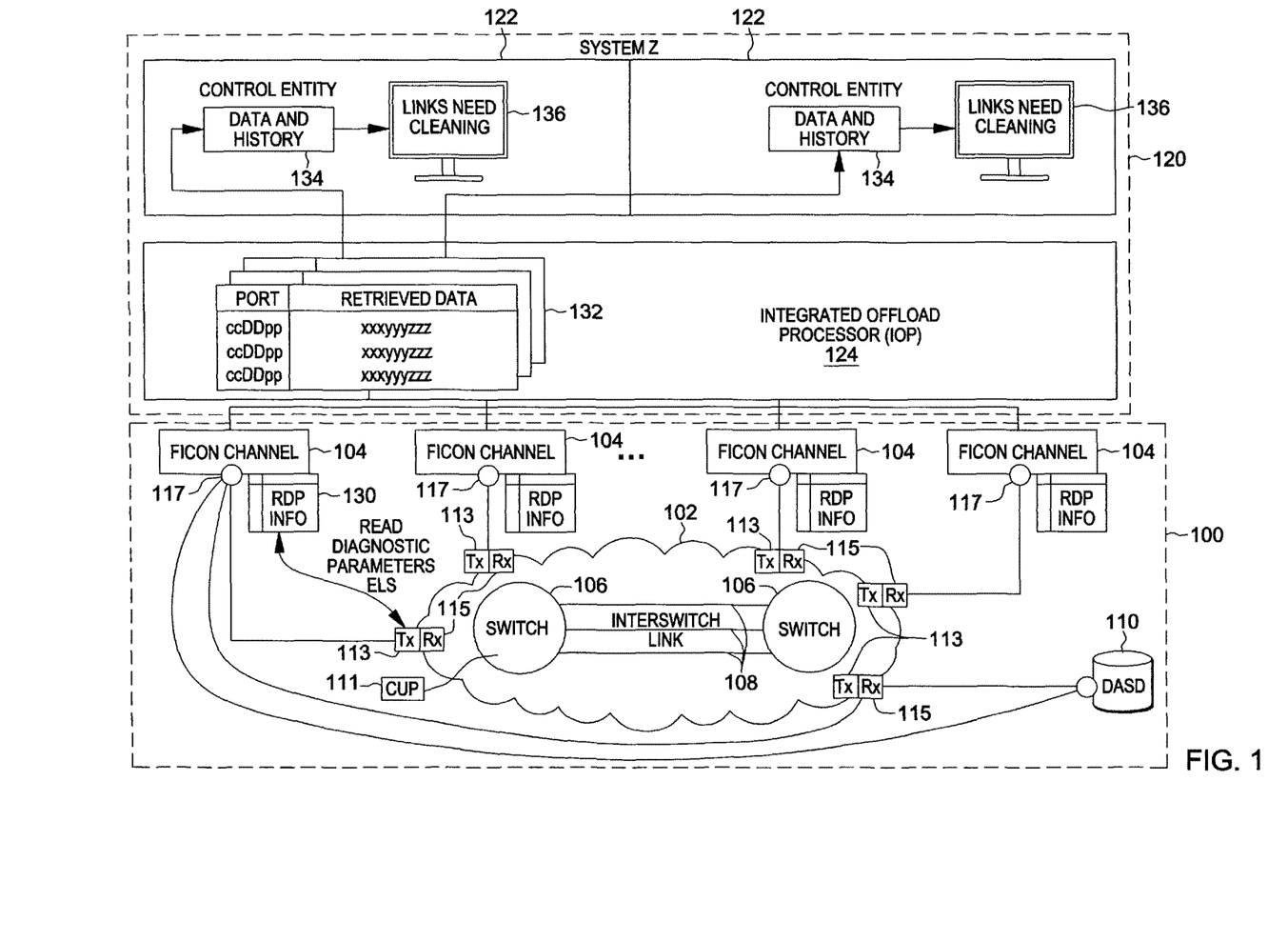
FIG. 1 depicts one example of a computing environment in which the health of a network of the computing environment is to be checked and the source of a detected fault/potential fault is to be identified, in accordance with one or more aspects.

One example of a network that uses a fabric is depicted in FIG. 1. In one example, a network 100, such as a storage area network or other type of network, includes, for instance, a fabric 102 coupled to one or more channels 104. In this particular example, the channels are FICON (Fibre Connection) channels; however, other types of channels may be used. Fabric 102 includes, for instance, one or more switches 106 that are interconnected via one or more interswitch links 108. A switch 106 and/or a channel 104 may be coupled to one or more storage devices 110, such as direct access storage devices (DASD), tape drives, etc. Further, in one example, a switch has one or more ports, referred to a control unit ports (CUPs) 111.

Fabric 102 further includes one or more transmitters 113 and one or more receivers 115 of data (which are also referred to as ports). Although a transmitter (Tx) 113 and a receiver (Rx) 115 are both shown at various points in the fabric; in other examples, there may be one or the other of a transmitter or a receiver. There also may be additional or less transmitters and/or receivers than depicted. Further, there may be ports (e.g., transmitters and/or receivers) at other points in the network, such as at the channels (see reference number 117) and/or elsewhere. Many variations exist.

In one example, network 100 is coupled to a server 120. Server 120 is, for instance, based on the z/Architecture offered by International Business Machines Corporation, Armonk, N.Y., and includes, for instance, one or more control entities 122, such as the z/OS operating system also offered by International Business Machines Corporation. In other examples, a control entity may be a component other than an operating system, such as a service element, or other type of component. Aspects of the z/Architecture are described in an IBM Publication entitled "z/Architecture—Principles of Operation," Publication No. SA22-7832-09, 10th Edition, September 2012, which is hereby incorporated by reference herein in its entirety. Z/ARCHITECTURE, IBM, and Z/OS are registered trademarks of International Business Machines Corporation, Armonk, N.Y. Other names used herein may be registered trademarks, trademarks or product names of International Business Machines Corporation or other companies.

Server 120 further includes at least one integrated offload processor (IOP) 124, which is coupled to at least one control entity 122 at one end and one or more channels 104 at the other end. As described in further detail below, the channels periodically fetch data 130, staggered over time. This data is stored at the integrated offload processor in, for instance, a database 132 and is accessible to control entities 122, as shown at 134. The data is used to determine whether there is a problem, such as, for instance, the optical connectors of the links need cleaning 136.

Figure 2:
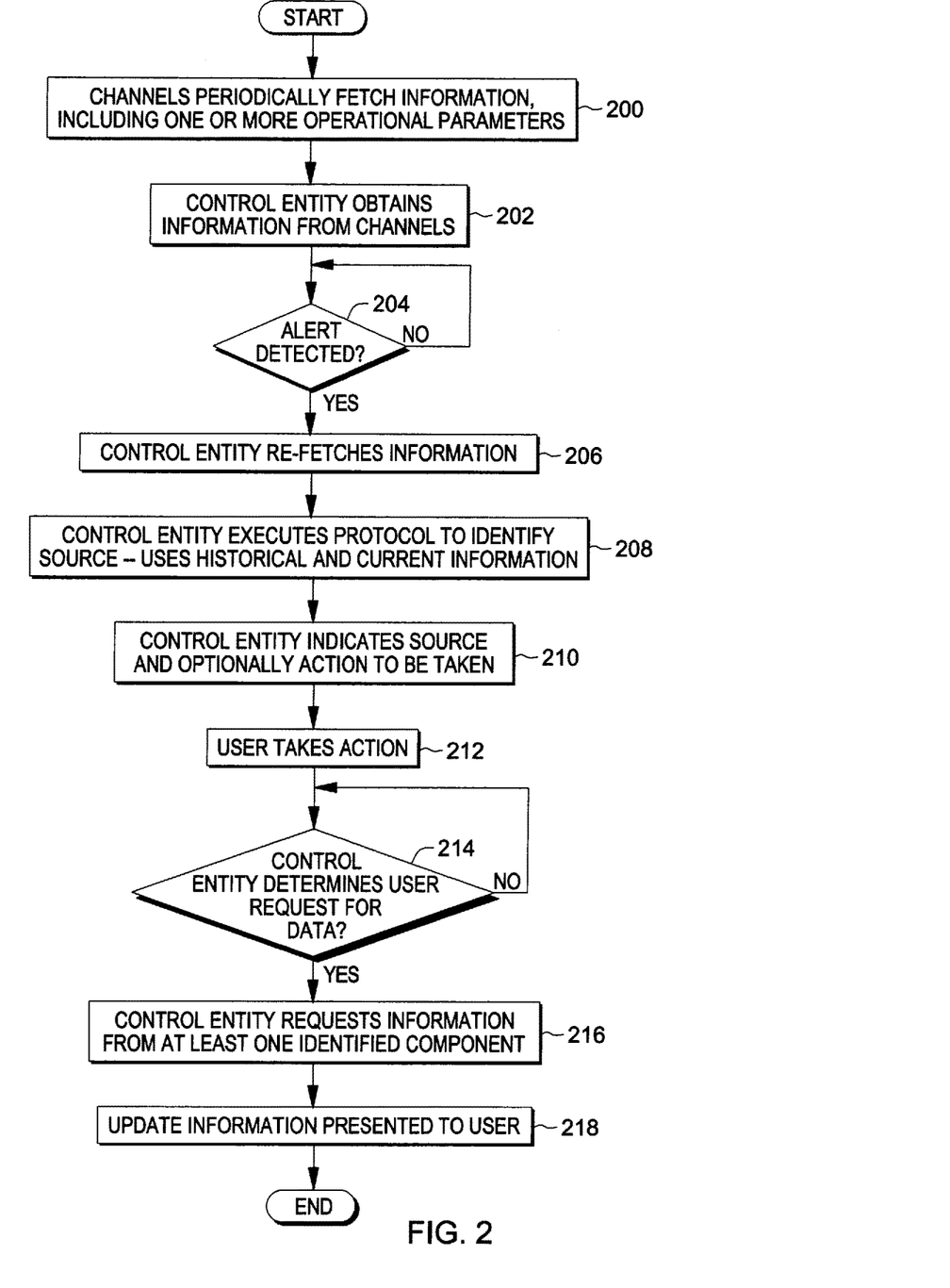
FIG. 2 depicts one embodiment of the logic used to check the health of a network and to identify the source of a detected fault or potential fault within the network, in accordance with one or more aspects.
Figure 3:
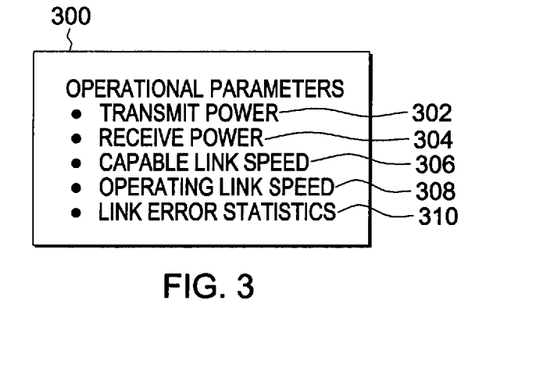
FIG. 3 depicts one example of various operational parameters to be gathered to determine the health of a network and/or the source of a detected fault or potential fault, in accordance with one or more aspects.

One embodiment of the logic to check the health of a network and to determine the source of a detected alert (e.g., fault or potential fault) is described with reference to FIG. 2. Referring to FIG. 2, initially, each of the channels periodically fetches information from one or more components of the network, STEP 200. For instance, each channel sends a Read Diagnostic Parameters (RDP) Extended Link Service (ELS) to all the links it knows about to gather values for one or more operational parameters of the links to obtain a historical perspective for those links. As depicted in FIG. 3, the operational parameters 300 may include, for instance, transmit (Tx) power 302, receive power (Rx) 304, capable link speed 306, operating link speed 308 and/or link error statistics 310. This information is gathered by the channel for its own link, its neighbor link at the switch, all links it can connect to, and their neighbor links at the switch.

The Extended Link Service is used in order to solicit a destination port to perform a link-level function or service. In this case, the RDP ELS requests an FC_Port to return the identified diagnostic parameters associated with the port identifier specified in the payload of the request. This provides the port transmitting the request with information that may be used for diagnosis of link or port related errors, or degraded conditions associated with the designated FC_Port.

The channels send out the RDP ELS in a staggered manner, one link at a time with delays between the links so not to overwhelm the switch with a burst of ELSs all at once. This gathering of the information is repeated periodically to maintain up-to-date information and to provide a historical perspective. The channels store this information in an area where it can be accessed by, for instance, one or more control entities.

Referring once again to FIG. 2, a control entity obtains this stored information on a periodic basis, STEP 202. It may also keep its own information on the interswitch links (ISLs) through interaction with a control unit port of the switch. In particular, the control entity obtains the same type of information for the ports of the interswitch links. For example, the information for the ISL ports may be gathered through a channel program executed by the CUP or through a standard management interface. This way, information exists for the entire path through the fabric.

Figure 4:
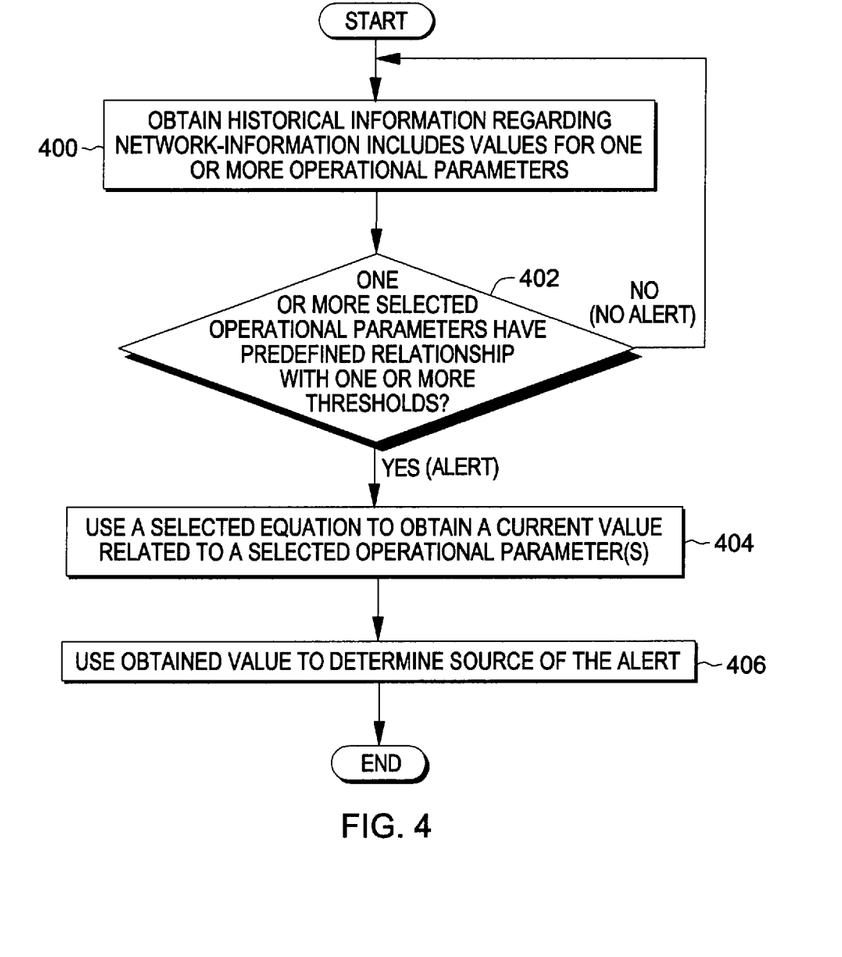
FIG. 4 depicts one embodiment of the logic used to determine the source of a fault or a potential fault, in accordance with one or more aspects.

The control entity then determines whether an alert has been detected, INQUIRY 204. As examples, the alert may be an error, such as a link error, known as an interface control check; an indication that the link is operating inefficiently (e.g., not at maximum or acceptable cable link speed and/or operating link speed); another type of error; or it just may be a prediction that an error or inefficiency may occur. If an alert has not been detected, then the control entity waits for detection of such an alert, INQUIRY 204. However, if an alert has been detected, then the control entity re-fetches the information associated with the alerted component (e.g., failed or failing link) to obtain the most current information for that component, STEP 206. The control entity then executes a protocol to identify the source or root cause of the alert, STEP 208. This protocol uses the historical information obtained, for instance, in STEP 200 and current information obtained, for instance, in STEP 206 and is described further below with reference to FIGS. 4 and 5.

The control entity may then display a message indicating the source of the alert, and optionally, recommend to the user an action to be taken, such as a repair action or a cleaning action, STEP 210. The user may then take one or more actions to address the alert, STEP 212. After the one or more actions are taken, the user can choose to display the data associated with the error again to see if there is an improvement. The request to display the data is provided via, for instance, an operator command. The control entity determines whether the operator command has been issued indicating that an action has been taken and the user would like to refresh the data, INQUIRY 214. If the control entity determines that such a request has not been made, then it waits for such a request, INQUIRY 214, or processing may end. Otherwise, if the control entity determines that such a request has been made, then the control entity invokes the channel to refresh its information for the component (e.g., link) in question, STEP 216. The updated information is then presented to the user along with the previous version of the information for comparison purposes, STEP 218. The user can also view and manually update the data for a link at any time.

As indicated above, the control entity, based on detecting an alert, executes a deterministic protocol to identify the source of the alert. One embodiment of the logic to identify the source of the alert is described with reference to FIG. 4. Initially, as described above, the control entity obtains historical information regarding the network, including gathered values for the one or more operational parameters, STEP 400. A determination is made as to whether one or more selected operational parameters of the one or more operational parameters have a predefined relationship with one or more thresholds, INQUIRY 402. If not, then no alert is indicated and processing continues with obtaining information regarding the network, STEP 400. However, if an operational parameter has a predefined relationship with a threshold, then a selected equation is used to obtain a current value related to the selected operational parameter, STEP 404. The obtained value is used to determine the source of the alert, STEP 406.

A specific example for determining the source of an alert is described with reference to FIG. 5. In this example, a determination is made as to whether the source of the alert is in the cable plant (e.g., dirty connector or bad cable) or whether it is the transmitter. However, this is only one example. Similar logic with different parameters and/or equations may be used to determine other types of alerts. Further, other logic may be used to predict faults or determine other types of alerts. This is only one particular example.

Figure 5:
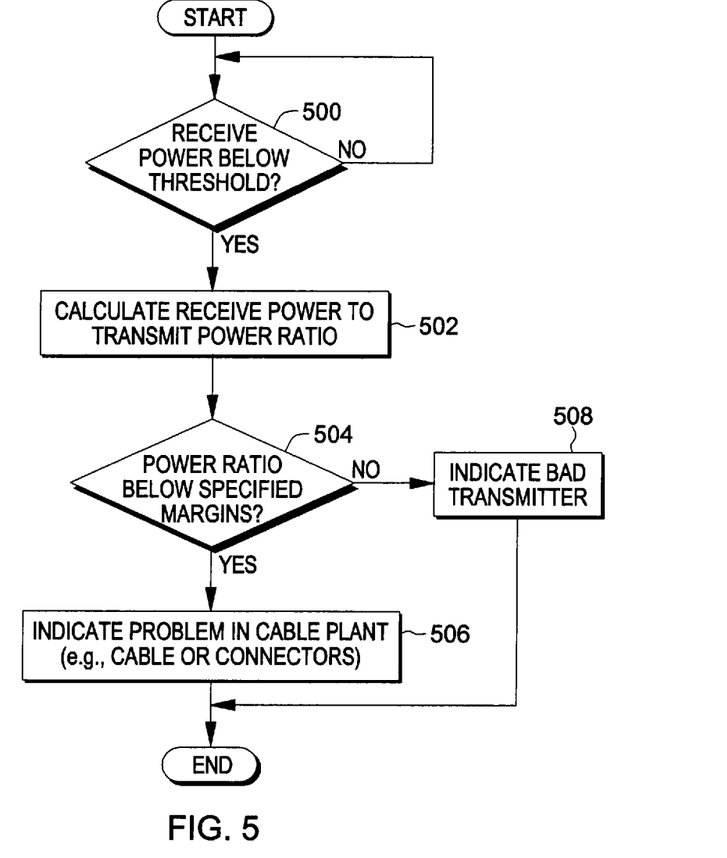
FIG. 5 depicts one particular example of determining a specific type of fault in accordance with one or more aspects.

Referring to FIG. 5, in this particular example, baseline values for receive (Rx) power are established by sampling the values for a period of time using the RDP ELS. Values are stored on a per link basis. They are also sampled after each data transmission error. Once a pattern is established indicating a low threshold for the receive power, that value is used, as described below.

Initially, a determination is made as to whether the receive power is below a defined threshold, INQUIRY 500. Examples of defined thresholds are provided in the Fibre Channel standard, such as FC-PI-6, and one such defined threshold is 0.095 mW (Receiver sensitivity). If the receive power is below the defined threshold, then a receive power to transmit power ratio is calculated using current values of receive power and transmit power, STEP 502. For instance, the receive power is divided by the transmit power to obtain a power ratio. If the power ratio is below one or more specified margins, INQUIRY 504, then a problem is indicated in the cable plant (e.g., a dirty connector or a bad cable), STEP 506. For instance, if the power ratio is below a specified margin indicated by the Fibre Channel standard (e.g., 0.095 mW (Receiver sensitivity)/0.479 mW (Transmitter minimum OMA-Optical Modulation Amplitude) or a margin of 20%), then a fault in the cable plant (e.g., cable or connectors) is indicated. Otherwise, since the receive power is low, but the receive/transmit power ratio is acceptable, then the transmit power is too low, so the problem is indicated as a bad transmitter, STEP 508.

Returning to INQUIRY 500, if the receive power is not below the defined threshold, then the receive power is acceptable and the link is indicated as acceptable.

Figure 6:
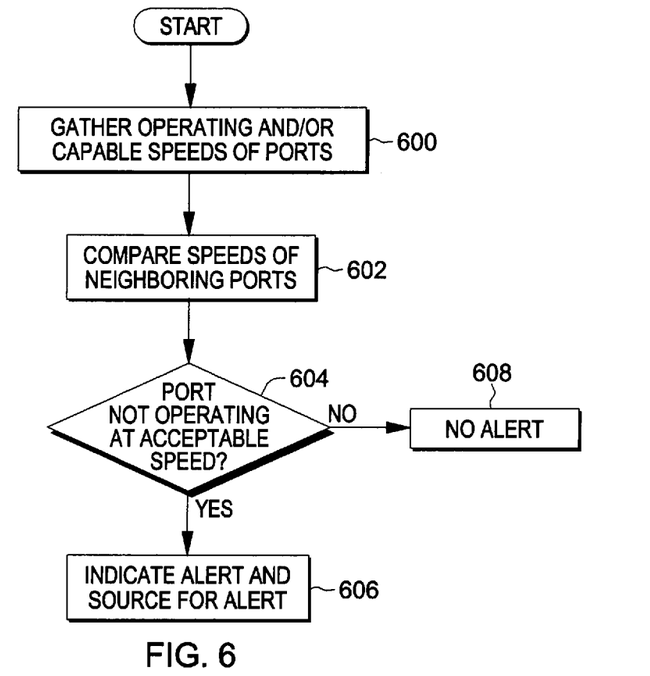
FIG. 6 depicts another embodiment of logic to determine the source of a fault or a potential fault, in accordance with one or more aspects.

In addition to the above, other examples are also possible. For instance, as one example described with reference to FIG. 6, the operating speed and/or capable speed of each port (or selected ports) of the network (e.g., 113, 115, 117 of FIG. 1) are gathered, STEP 600. Then, the speeds of neighboring ports are compared, STEP 602. If one or more ports are not operating at an acceptable speed, such as the highest common speed, INQUIRY 604, then an alert is indicated, STEP 606, and the source for the alert is determined, e.g., to be the link between the neighboring ports (e.g., pair of ports) that are compared and for which at least one of those ports is not operating at the acceptable speed. Otherwise, no alert is indicated in this example, STEP 608. Other examples are also possible.

One or more aspects of the capability enable the identification of the source of an alert. For instance, assume based on the periodic gathering of RDP data, it is determined that a DASD has failed. The channel would gather information from its port, its switch entry port, the DASD's port and the DASD's switch entry port since the failure of the DASD could have been triggered by any one of those components and any interswitch links between the switches. The gathered data is then used in the deterministic approach described herein to determine which component is the cause or source of the DASD failure.

Described in detail above are techniques for deterministically checking the health of a network and detecting the source of alerts, when such alerts are indicated. In one example, information passed back in the Read Diagnostic Parameters Extended Link Service, such as receive power, transmit power, capable link speed, operating link speed and/or link error status block, is used to determine an overall view of the health of the network and to identify the source of actual or potential faults. A capability is provided for reliably determining whether data transmission errors in, for instance, optical links are caused by failures in optical transmitters, by cable/connector problems, or by failure of receiver electronic circuitry. These errors are particularly sensitive to the receiver's Light Input Power (LIP), and the capabilities described herein allow collection of relevant data and the use of that data to deterministically identify the cause of a fault or potential fault, since the source of the fault is often not at the component that indicated the fault and may not be readily apparent.

In one example, the capability includes the channels periodically fetching data, e.g., values for the operational parameters, staggered over time; the control entity retrieving the data from the input/output subsystem (e.g., the channel subsystem); the control entity re-fetching the data after an error or potential error and executing the protocol to identify the source of the fault or potential fault; the user optionally performing a cleaning or repair action; the user optionally requesting the data again via an operator command; and the control entity requesting the input/output subsystem to refresh the data for at least the requested channel. Further, optional health checks are performed that look at the RDP data to ensure that the links have initialized to the correct speeds across all paths to the control unit and across all links to the control unit.

In one embodiment, a database of operational parameters of every fiber optic module (or selected fiber optic modules) in the network is maintained, and those operational parameters include, e.g., transmit power, receive power, capable link speed, operating link speed, and/or link error statistics, etc. The database is continually updated by low frequency polling of the data, and the data may also be refreshed on demand. The database may be queried periodically for links which are not operating at the capable link speed and a repair/cleaning action may be generated. Further, when an error occurs or a potential error is determined, the database plus the current data values are used in the isolation protocol to determine the source of the fault or potential fault and to generate a repair/cleaning action. Upon completion of the action, the current values may be refreshed again for the repaired component(s) to determine whether the values after the repair are within the acceptable specification.

As one particular example, the isolation protocol for identifying the source includes a technique for fault isolation in a fiber optic network, in which isolation includes determining whether the transmitter module or the cable plant is at fault. The technique includes, for instance, sampling the receiver and transmitter optical power levels on the occurrence of a bit error (or other error or potential error); comparing the receive power to historical good levels; if the receive power is found to be low, determining the ratio of the receive power to the transmit power; if the ratio of receive power to transmit power is lower than the specified limits, identifying that the cable plant is at fault; if the ratio of the receive power to transmit power is within specified limits, then determining that the transmitter module is at fault; and if the receive power is determined not to be low, then neither component is at fault.

Figure 7:
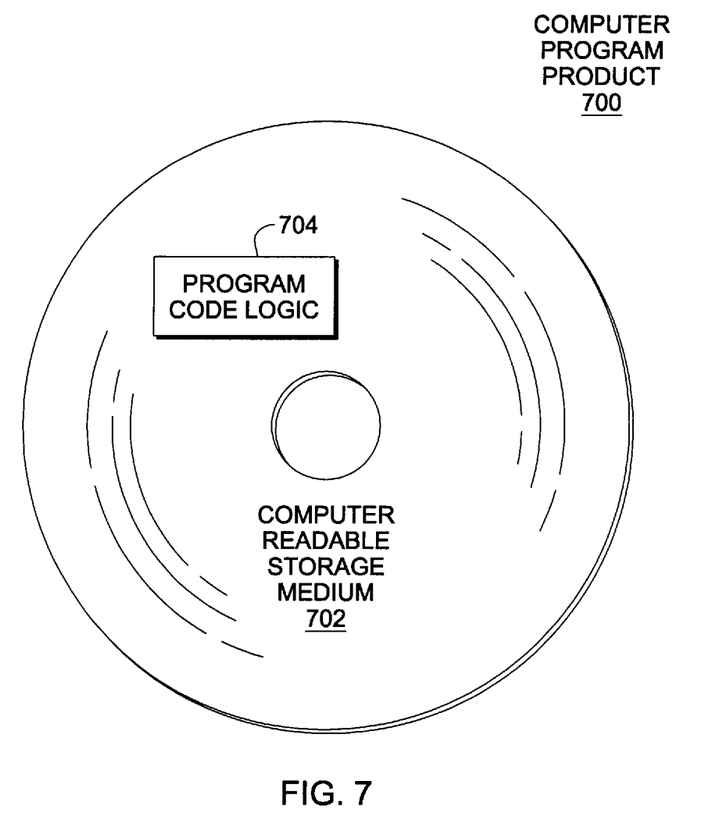
FIG. 7 depicts one embodiment of a computer program product incorporating one or more aspects.

Referring to FIG. 7, in one example, a computer program product 700 includes, for instance, one or more non-transitory computer readable storage media 702 to store computer readable program code means, logic and/or instructions 704 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different operational parameters and/or equations may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of isolating sources of alerts within computing networks, said computer-implemented method comprising:
   obtaining, by a control entity executing on a processor of a computing environment, one or more values for one or more operational parameters of a network of the computing environment;
   detecting by the control entity an alert associated with the health of the network;
   obtaining, by the control entity based on detecting the alert, at least one current value for at least one operational parameter of the one or more operational parameters; and
   determining a source for the alert, wherein the determining the source for the alert comprises using at least a portion of the obtained one or more values for the one or more operational parameters and the obtained at least one current value for the at least one operational parameter to determine the source of the alert.

2. The computer-implemented method of claim 1, wherein the obtaining the one or more values for the one or more operational parameters comprises retrieving by the control entity from an input/output subsystem coupled to the control entity the one or more values for the one or more operational parameters, wherein the input/output subsystem periodically fetches the one or more values for the one or more operational parameters from one or more components of the network using a read diagnostic parameter extended link service.

3. The computer-implemented method of claim 2, wherein the periodically fetching is staggered over time.

4. The computer-implemented method of claim 1, wherein the determining the source for the alert comprises:

determining that a selected operational parameter of the one or more operational parameters has a predefined relationship with respect to a selected threshold; and based on determining that the selected operational parameter has the predefined relationship with respect to the selected threshold, using a selected equation related to the selected operational parameter to determine the source.

5. The computer-implemented method of claim 4, wherein the selected operational parameter comprises receive power and the predefined relationship comprises below the threshold.

6. The computer-implemented method of claim 5, wherein the selected equation comprises a receive power to transmit power ratio providing a power ratio.

7. The computer-implemented method of claim 6, wherein the network includes a cable plant and a transmitter, and wherein the using the selected equation comprises:

determining whether the power ratio is below a specified margin;

based on the power ratio being below the specified margin, indicating a problem in the cable plant; and based on the power ratio being equal or above the specified margin, indicating a problem in the transmitter.

8. The computer-implemented method of claim 1, further comprising requesting information from at least one identified component of the network, based on one or more actions being performed based on determining the source.

9. The computer-implemented method of claim 1, wherein the alert comprises one of a fault in the network or a predicted fault in the network.

10. The computer-implemented method of claim 1, wherein the network comprises a plurality of ports, the at least a portion of the obtained one or more values for the one or more operational parameters comprises values representing speeds of multiple ports of the plurality of ports, and wherein the determining the source for the alert comprises comparing the values representing speeds of the multiple ports.

* * * * *